United States Patent [19]

Geisthoff et al.

[11] Patent Number: 4,642,067

[45] Date of Patent: Feb. 10, 1987

[54] PROTECTIVE BELLOWS ASSEMBLY WITH PLUGGED LUBRICATING APERTURE

[75] Inventors: Hubert Geisthoff; Theo Buthe, both of Lohmar, Fed. Rep. of Germany

[73] Assignee: Jean Walterscheid GmbH, Lohmar, Fed. Rep. of Germany

[21] Appl. No.: 842,543

[22] Filed: Mar. 21, 1986

[30] Foreign Application Priority Data

Mar. 29, 1985 [DE] Fed. Rep. of Germany ....... 3511578

[51] Int. Cl.⁴ .......................... F16C 1/26; F16D 3/84
[52] U.S. Cl. ........................... 464/175; 277/212 FB; 403/50; 74/18.1
[58] Field of Search ............. 403/50, 51; 74/18, 18.1, 74/18.2; 464/173, 174, 175, 7; 277/212 FB

[56] References Cited

U.S. PATENT DOCUMENTS 3,187,590  6/1965  Duggan .................................. 403/51

FOREIGN PATENT DOCUMENTS 2304042  8/1974  Fed. Rep. of Germany .
709117  5/1954  United Kingdom ................ 464/175

Primary Examiner—Andrew V. Kundrat
Attorney, Agent, or Firm—Toren, McGeady, Stanger, Goldberg & Kiel

[57] ABSTRACT

A protective bellows, particularly for use in drivelines of agricultural implements, is formed with a resilient bellows having a lubricating opening with a removable plug. A resilient ring extends around the bellows in one of the folds thereof, and a connection member is provided on the resilient ring for connecting the plug thereto.

4 Claims, 3 Drawing Figures

PROTECTIVE BELLOWS ASSEMBLY WITH PLUGGED LUBRICATING APERTURE

The present invention is directed generally to protective bellows, particularly of the type useful with universal joints. More specifically, the invention is directed toward a protective bellows for covering a joint, especially in the driveline of an agricultural implement driven from the power takeoff shaft of a tractor.

More specifically, the invention relates to provision in the bellows member of an aperture for enabling lubrication of the joint, with the aperture being sealable by a plug.

A cover for a joint designed with a bellows having an aperture for filling of the covering with grease, which is sealable by means of a plug, is known from DE-OS No. 2 304 042. In this arrangement, a loosely held plug is provided which is equipped with an edge radially increased toward the inside thereof at its insertion end. The disadvantage of the layout which is described in the prior art is that the plug could easily be lost and that the aperture thus would remain open for longer operating periods. Furthermore, it could occur that the plug may not be inserted into the aperture when appropriate due to an oversight.

Over and above the foregoing, it is usually difficult to insert the plug into the covering because, due to the flexible design of the covering, it will yield or bend, and, accordingly, there is not sufficient stiffness to permit the plug to be conveniently or readily inserted.

SUMMARY OF THE INVENTION

The present invention is directed toward providing a protective bellows having a sealable aperture for the purposes of lubrication with a plug arranged for sealing of the aperture being retained so that it is impossible to lose the plug while, at the same time, enabling a self-acting sealing of the aperture by the plug. With the present invention, the plug, if desired, could be transposed into a stable open position.

The invention is particularly characterized by the fact that the plug is connected with a resilient or rubber ring which is retained in a fold of the protective bellows under a preload and that the resilient ring is provided in the area where the plug is attached thereto on the side facing away from the plug with a connecting member, which may be a tongue or an eccentric or cam member, abutting at the fold.

One advantage of the present invention is that the plug is retained in its functional position by the resilient ring so that it cannot be lost and that a restoring force in the sealing direction is exerted upon the plug by means of the tongue abutting upon the fold.

In a preferred embodiment of the invention, the resilient ring is provided in the area of the plug with an eccentric or cam member whose center is offset with respect to the resilient ring in the axial direction of the protective bellows facing away from the plug.

It is possible in this arrangement to transpose the plug into a stable open position which may, for example, be shown to be appropriate in order to improve the visibility of a lubrication nipple arranged at the joint.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there are illustrated and described the preferred embodiments of the invention.

DETAILED DESCRIPTION OF THE PREFERRED EMBODIMENTS

Figure 1:
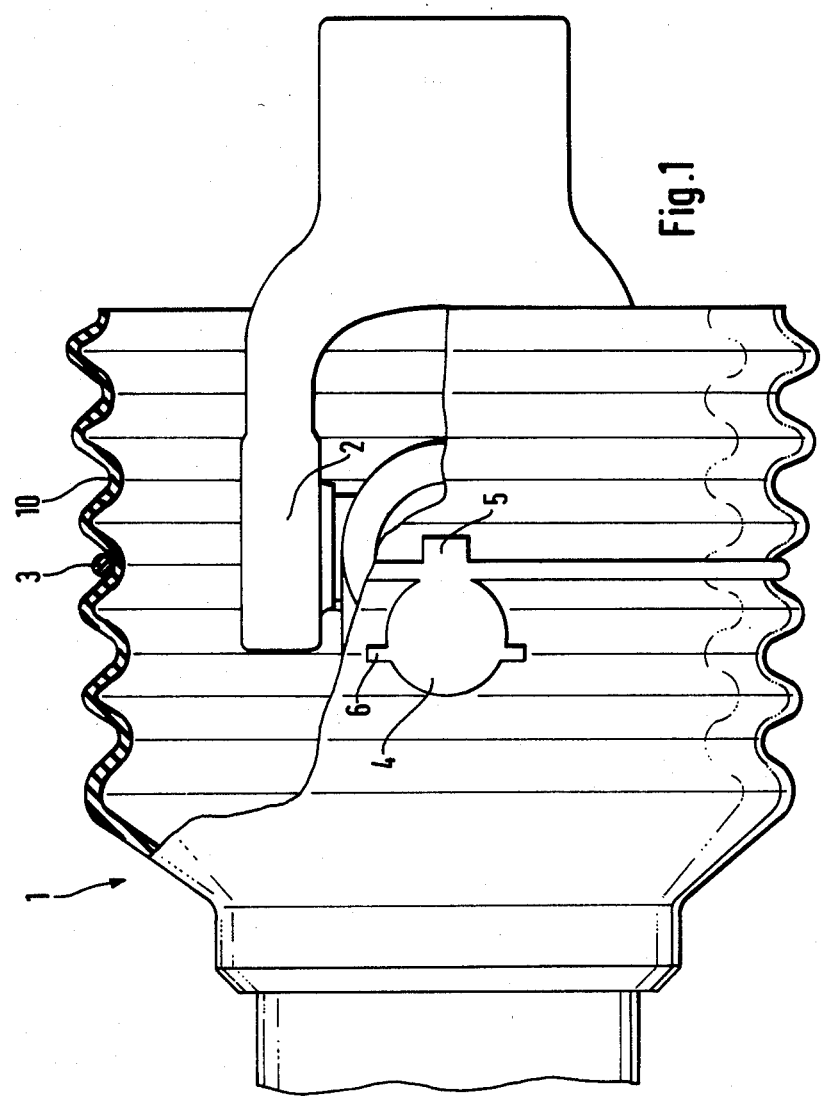
FIG. 1 is a side view partially in section showing a protective bellows assembly in accordance with the present invention.

Referring now to the drawings and more particularly to FIG. 1, there is shown a protective bellows assembly in accordance with the present invention comprising a protective bellows 1, which, as shown in FIG. 1, is formed with a series of folds 10 having a generally sinusoidal configuration. The protective bellows 1 is arranged to enclose a joint 2 and the folds in the bellows enable longitudinal displacement of the bellows and the parts connected thereto in the case where the joint 2 is deflected.

The bellows member 1 is formed with an aperture 7 within which a plug 4 may be inserted. The aperture 7 is for the purpose of permitting lubrication and the plug 4 is removably inserted in the aperture 7.

Figure 2:
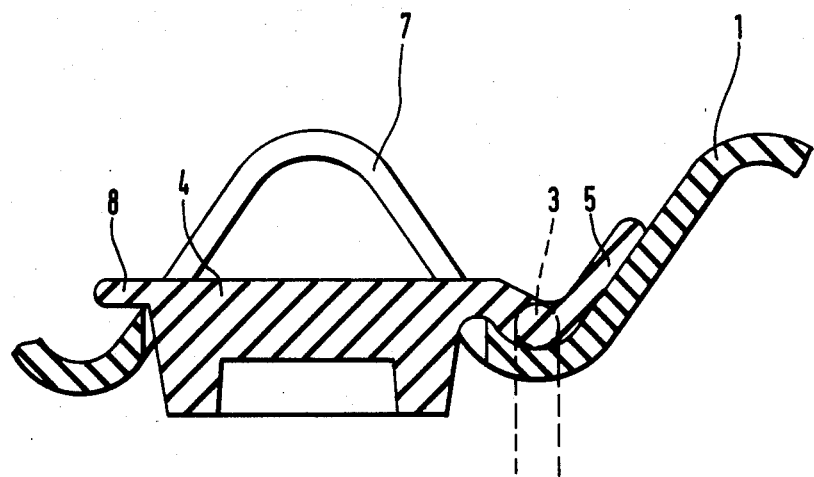
FIG. 2 is a partial longitudinal sectional view taken through the protective bellows showing a plug with a flexible tongue.

A resilient ring 3 which may be made of rubber is retained in one of the folds 10 of the bellows 1 and it is connected with the plug 4 in an elastic manner. A tongue 5 is provided at the side of the resilient ring 3 facing away from the plug 4, with the tongue 5 being supported at a rise of a fold 10, as best seen in FIG. 2, and it thus applies a force acting upon the resilient ring 3 and the plug 4 in a closing direction. That is, as can be seen from FIG. 2, the resilient deformation of the tongue 5 as it engages within a fold 10 tends to apply a resilient force to the plug 4 in a direction inwardly of the aperture 7.

A pair of lugs 6 are provided at the plug 4 which, on the one hand, serve as facilitating handling of the plug for removing the plug from the aperture 7, while, on the other hand, preventing the plug 4 from being snapped inwardly of the aperture 7 to the interior of the bellows 1.

FIG. 2 shows the plug 4 retained in the aperture 7 in its sealing position, with the arrangement of the tongue 5 operating to generate the closing force and the manner in which it is supported against the fold 10.

Figure 3:
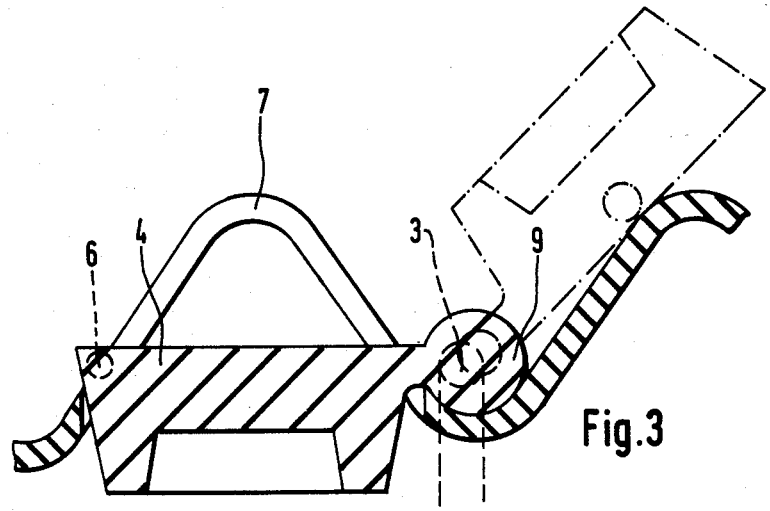
FIG. 3 is a partial longitudinal sectional view through the protective bellows assembly with an excenter or cam arranged at the plug.

In FIG. 3, there is shown a plug 4 having an eccentric or cam member 9 which provide the closing force with the plug 4 being shown in its sealing position in solid line and in its open position in broken dotted line.

In the embodiment of FIG. 3, a deadpoint position can be reached by the eccentric or excenter 9 if the center of the resilient ring 3 and the center of the eccentric or cam 9 assume a position perpendicular with respect to the longitudinal axis of the bellows 1. Before this deadpoint position, the automatic closure of the aperture 7 is assured, and after this deadpoint position, as is indicated in broken dotted line in FIG. 3, the open position is retained.

In place of the lugs 6, a gripping lug 8 may be provided which operates to perform the same function.

Thus, in accordance with the present invention, it will be seen that a protective bellows is provided with a sealable aperture for the purposes of lubrication in which sealing by means of a plug 4 is effected so that the plug is retained in its position closing the lubricating aperture and so that it cannot be lost or displaced. Simultaneously, automatic sealing of the aperture is provided by the plug and the plug, if desired, can be transposed into a stable open position.

The basic features of the invention arise by the structure depicted in the drawings, wherein the plug 4 is connected with the resilient ring 3 which is retained in a fold 10 of the bellows 1 under a spring preload with the resilient ring 3 being provided in the area of the plug 4 at a side facing away from the plug 4 with engagement means such as, for example, the tongue 5 or the eccentric member 9, whereby a resilient force is provided tending to maintain the plug 4 in the closed position while also enabling the plug 4 to be retained in its open position.

With regard to the embodiment of FIG. 3, it will be seen that the eccentric member 9 is formed with an opening through which the ring 3 extends, the opening or orifice in the member 9 being somewhat larger than the ring 3 and operating so that when the plug 4 is in the solid line position shown in FIG. 3, the spring force of the ring 3 holds the plug toward its closed position, while, when the plug 4 is rotated to the dotted broken line position, the engagement between the ring 3 and the member 9 tends to hold the plug 4 retained in its open position.

While the specific embodiments of the invention have been shown and described in detail to illustrate the application of the inventive principles, it will be understood that the invention may be embodied otherwise without separting from such principles.

What is claimed is:

1. A protective bellows assembly for a joint particularly useful with a drive shaft for driving an agricultural implement from a power takeoff shaft of a tractor comprising:
    a resilient bellows member having formed therein a series of folds and an aperture through which a joint upon which said bellows member is mounted may be lubricated;
    a removable plug for sealing said aperture;
    a resilient ring extending around said bellows in one of said folds having said plug connected thereto;
    at least one lug member on said plug for facilitating manual movement of said plug; and
    retention means provided on said plug engaging within one of said folds tending to retain said plug within said aperture.

2. An assembly according to claim 1, wherein said retention means comprise a tongue extending on a side of said resilient ring opposite said plug and engaging on a side of said bellows to apply a resilient force against said plug inwardly of said aperture.

3. An assembly according to claim 1, wherein said retention means comprise an eccentric member formed on said plug engaged by said resilient ring to hold said plug in a position within said aperture and to also retain said plug in an open position disengaged from said aperture.

4. An assembly according to claim 1, wherein said resilient ring is provided in the area of said plug with an eccentric member constituting said retention means centrally offset with respect to said resilient ring in the axial direction of said bellows member facing away from said plug.

* * * * *